(12) United States Patent
Thomas et al.

(10) Patent No.: US 8,322,149 B2
(45) Date of Patent: Dec. 4, 2012

(54) METHOD FOR SELECTING LUBRICANTS FOR HEAT PUMPS

(75) Inventors: Raymond H. Thomas, Pendleton, NY (US); Christopher J. Seeton, East Amherst, NY (US); David P. Wilson, East Amherst, NY (US); Samuel F. Yana Motta, East Amherst, NY (US); Mark W. Spatz, East Amherst, NY (US)

(73) Assignee: Honeywell International Inc., Morristown, NJ (US)

( * ) Notice: Subject to any disclaimer, the term of this patent is extended or adjusted under 35 U.S.C. 154(b) by 897 days.

(21) Appl. No.: 12/416,734

(22) Filed: Apr. 1, 2009

(65) Prior Publication Data
US 2009/0241562 A1  Oct. 1, 2009

Related U.S. Application Data

(60) Provisional application No. 61/041,474, filed on Apr. 1, 2008, provisional application No. 61/043,486, filed on Apr. 9, 2008.

(51) Int. Cl.
*F25B 43/02* (2006.01)
(52) U.S. Cl. .......................................................... 62/84

(58) Field of Classification Search ................. 62/116, 62/122, 180, 502, 84
See application file for complete search history.

(56) References Cited

U.S. PATENT DOCUMENTS

| | | | |
|---|---|---|---|
| 3,299,654 A * | 1/1967 | Leonard, Jr. ................. 62/116 |
| 4,448,030 A * | 5/1984 | Moss ................................. 62/79 |
| 4,755,316 A | 7/1988 | Magid et al. |
| 4,948,525 A | 8/1990 | Sasaki et al. |
| 4,971,712 A | 11/1990 | Gorski et al. |
| 4,975,212 A | 12/1990 | Thomas et al. |
| 5,008,028 A | 4/1991 | Jolley et al. |
| 5,254,280 A | 10/1993 | Thomas et al. |
| 5,887,441 A | 3/1999 | Spauschus et al. |
| 6,516,837 B2 | 2/2003 | Thomas et al. |
| 7,062,930 B2 * | 6/2006 | Rayburn ...................... 62/173 |
| 2006/0048523 A1 | 3/2006 | Kwon |

FOREIGN PATENT DOCUMENTS

JP  11-094380 A  4/1999
* cited by examiner

*Primary Examiner* — Melvin Jones
(74) *Attorney, Agent, or Firm* — Colleen D. Szuch

(57) ABSTRACT

Provided is a method for selecting a lubricant and a refrigerant for use in a vapor-compression refrigeration device such that the combination of the lubricant and refrigerant produces a fluid system having a lubricant-rich phase and a refrigerant-rich phase, yet exhibits miscible-type properties.

27 Claims, 2 Drawing Sheets

METHOD FOR SELECTING LUBRICANTS FOR HEAT PUMPS

CROSS REFERENCE TO RELATED APPLICATIONS

This application claims the priority benefit of U.S. Provisional Application No. 61/041,474, filed Apr. 1, 2008, and U.S. Provisional Application No. 61/043,486, filed Apr. 9, 2008, each of which are incorporated herein by reference in their entirety.

BACKGROUND

1. Field of Invention

The present invention relates to methods for selecting lubricants used in heat pumps. More particularly, the invention relates to methods used to select lubricants and hydrofluoroolefins refrigerant combinations for use in compressor-type heat pumps.

2. Description of Prior Art

The use of chlorine-containing refrigerants, such as chlorofluorocarbons (CFC's) and hydrochlorofluorocarbons (HCFC's), in a compression-type refrigeration device (e.g., heat pumps, air conditioners, refrigerators, and the like) is disfavored because these refrigerants can damage the Earth's ozone if they leak or are otherwise discharged from the device. Accordingly, it is desirable to retrofit chlorine-containing refrigeration systems by replacing chlorine-containing refrigerants with non-chlorine-containing refrigerant compounds that will not deplete the ozone layer, such as hydrofluoroalkanes (HFCs) or hydrofluoroolefins (HFOs). Of these, HFOs are more desirable because they are typically characterized as having a much lower Global Warming Potential (GWP).

Preferably, these replacement refrigerants are compatible (e.g., miscible) with conventional compression-type refrigeration device lubricants. Such compatibility allows lubricant to flow more easily with the refrigerant throughout the system thereby increasing the system's efficiency and expected life span. The lack of compatibility can result in separation of the refrigerant and lubricant into different phases. If phase separation occurs between the refrigerant and lubricant while the refrigerator is running, it affects the life and efficiency of the apparatus seriously. For example, if phase separation of the refrigerant and the lubricating oil occurs in the compressor, the moving parts would be inadequately lubricated, resulting in seizure or other troubles and thereby the life of apparatus is shortened considerably. If phase separation occurs in the evaporator, a lubricating oil having high viscosity exists and thereby the efficiency of heat exchange is decreased. Unfortunately, many non-chlorine-containing refrigeration fluids, including HFCs and HFOs, are relatively insoluble and/or immiscible in conventional lubricants, including, for example, mineral oils, alkylbenzenes or polyalpha-olefins. In order for a refrigeration fluid-lubricant combination to work efficiently within a compression refrigeration, air-conditioning or heat pump system, the lubricant is preferably compatible with a refrigerant over a wide range of operating temperatures.

Generally, a compression-type refrigeration device is composed of a compressor, a condenser, expansion valve, and an evaporator, having a mechanism wherein the mixture of a refrigerant and a lubricating oil is circulating in the closed system. In said compression-type refrigeration device, though it depends on the kind of apparatus, generally the temperature in the compressor rises to about 50° C. or higher, while in the cooler, the temperature comes to be about −40° C. Accordingly, the refrigerant and the lubricating oil must circulate in this system without phase separation usually in the range of about −40 to +50° C. (See, e.g., U.S. Pat. No. 5,536,881, which is incorporated herein by reference.)

Accordingly, the selection of a lubricant for a compression-type refrigeration device should include an analysis of the lubricant's miscibility with the desired refrigerant. Achieving miscibility reduces the need for an oil separator, which can be installed immediately after the compressor to capture immiscible oil and return it to the compressor to maintain a desired level of lubrication. Maintaining good lubrication reduces problems associated with low oil return, including fouling of the heat exchanger surfaces and burn-out of the compressor. However, as noted above, many desirable HFC and HFO refrigerant are immiscible in conventional lubricants at room temperature. Although various mixtures of HFO and lubricants are known (see, e.g., US Patent Application Publication No. 2004/00898, which is incorporated herein by reference in its entirety), there remains a need for a method of selecting a lubricant that is compatible with HFC, and particularly HFO, refrigerants.

SUMMARY OF THE INVENTION

It has been surprisingly found that certain refrigerant/lubricant combinations used in compression-type refrigeration devices did not result in oil return problems, despite the lack of miscibility between the refrigerant and lubricant. For example, a fluid system comprising certain HFO refrigerants and certain lubricants have been found to exhibit a miscible-type property during the operation of a compression-type refrigeration devices even though the refrigerant and lubricant form two phases at the upper operating temperature of the device and also at lower operating temperatures.

As used herein, the term "upper operating temperature" means the temperature of the refrigerant at the outlet of the condenser during normal device operation and is generally between about +30° C. and about +75° C., and preferably about +40° C. to about +50° C. The term "lower operating temperature" means the temperature of the refrigerant at the outlet of the expansion value during normal device operation and is generally between about −40° C. to about +25° C. In certain preferred embodiments, particularly for embodiments wherein the device is refrigeration equipment, the lower operating temperature is in a range of −40 to −5° C. In certain other preferred embodiments, particularly for embodiments wherein the device is a refrigerator or heat pump, the lower operating temperature is in a range of about −20 to +5° C. In certain other preferred embodiments, particularly for embodiments wherein the device is an air conditioner, the lower operating temperature is in a range of about 0 to +15° C.

As used herein, the term "phase" means a compositional region of a fluid system that is substantially chemically uniform and physically distinct. The phase size may be microscopic or, more preferably, macroscopic.

The term "lubricant" means a substance that when disposed between two moving surfaces, tends to reduce the friction between the surfaces, thereby improving efficiency and reducing wear. Lubricants may optionally have the function of dissolving and/or transporting foreign particles in a device.

The term "refrigerant" means one or more compounds that undergo a phase change from a gas to a liquid and back in a conventional compression-type refrigeration device to effectively transfer heat to or from an environment.

The term "lubricant-rich phase" means a phase in a fluid system comprising a majority of lubricant relative to refrigerant (i.e., more than about 50 weight % and less than 100 weight %). In certain embodiments, the lubricant-rich phase comprises from about 10 to about 90 wt. % lubricant relative to refrigerant, more preferably about 25 to about 70 wt. %, and even more preferably about 40 to about 60 wt %.

The term "refrigerant-rich phase" means a phase in a fluid system comprising a majority of refrigerant (i.e., more than about 50 weight % and less than 100 weight %), preferably at least about 75 wt. % to less than 100 wt. % refrigerant relative to lubricant, and more preferably at least about 90 to about 98 wt. % refrigerant relative to lubricant.

With respect to a fluid system comprising a refrigerant-rich phase and a lubricant-rich phase, inversion of the phases occurs as the density of each phase inversely changes with respect to a change in temperature, i.e., a first phase that is more dense with respect to a second phase at one temperature changes to become less dense compared to the second phase as a different temperature. More particularly, at relatively low temperatures, the refrigerant-rich phase is denser than the lubricant-rich phase and, accordingly, settles to the bottom of the fluid system. As the temperature rises, the lubricant-rich phase becomes heavier and sinks to the bottom. This phase inversion is believed to produce the miscible-type characteristic observed in the fluid system. Lubricant return to the compressor is therefore improved.

Accordingly, an aspect of the invention is a method for selecting a refrigerant and lubricant for a vapor-compression refrigeration device system comprising the steps of: (a) determining a lower operating temperature range of a vapor-compression refrigeration device; (b) determining an upper operating temperature range of the vapor-compression refrigeration device; and (c) selecting a refrigerant comprising at least one $C_2$ to $C_5$ fluoroalkene at a first concentration and selecting a lubricant comprising at least one polyol ester, polyalkylene glycol, or polyalkylene glycol ester at a second concentration to produce a fluid system having a refrigerant-rich phase and a lubricant-rich phase at a first temperature within said lower operating temperature range and at a second temperature within said upper operating temperature range provided that said second temperature is higher than said first temperature, wherein the refrigerant-rich phase is denser relative to the lubricant-rich phase at said first temperature and wherein the lubricant-rich phase is denser relative to the refrigerant-rich phase at said second temperature, provided that the relative difference in densities between the two phases is less than 20% at said first temperature and less than 20% at said second temperature.

In another aspect of the invention, provided is a method for introducing a refrigerant and lubricant into a vapor-compression refrigeration device system comprising the steps of: (a) providing a vapor-compression refrigeration device comprising a heat transfer circuit, a compressor having an inlet side and an outlet side, and refrigerant and lubricant reservoir, wherein said reservoir is in fluid communication with the inlet side of the compressor and with said heat transfer circuit, and said heat transfer circuit is in fluid communication with said outlet side of the compressor; (b) determining the lower operating temperature range of the vapor-compression refrigeration device; (c) determining the upper operating temperature range of the vapor-compression refrigeration device; (d) selecting a refrigerant comprising at least one $C_2$ to $C_5$ fluoroalkene at a first concentration and selecting a lubricant comprising at least one polyol ester or polyalkylene glycol at a second concentration to produce a fluid system having a refrigerant-rich phase and a lubricant-rich phase at a first temperature within said lower operating temperature range and at a second temperature within said upper operating temperature range provided that said second temperature is higher than said first temperature, wherein the refrigerant-rich phase is denser relative to the lubricant-rich phase at said first temperature and wherein the lubricant-rich phase is denser relative to the refrigerant-rich phase at said second temperature; and (e) introducing said refrigerant and lubricant into the vapor-compression refrigeration device.

In yet another aspect of the invention, provided is a method for lubricating a vapor-compression refrigeration device system comprising the steps of: (a) providing a vapor-compression refrigeration device comprising a heat transfer circuit, a compressor having an inlet side and an outlet side, and refrigerant and lubricant reservoir, wherein said reservoir is in fluid communication with the inlet side of the compressor and with said heat transfer circuit, and said heat transfer circuit is in fluid communication with said outlet side of the compressor; (b) determining the lower operating temperature range of the vapor-compression refrigeration device; (c) determining the upper operating temperature range of the vapor-compression refrigeration device; (d) selecting a refrigerant comprising at least one $C_2$ to $C_5$ fluoroalkene at a first concentration and selecting a lubricant comprising at least one polyol ester or polyalkylene glycol at a second concentration to produce a fluid system having a refrigerant-rich phase and a lubricant-rich phase at a first temperature within said lower operating temperature range and at a second temperature within said upper operating temperature range provided that said second temperature is higher than said first temperature, wherein the refrigerant-rich phase is denser relative to the lubricant-rich phase at said first temperature and wherein the lubricant-rich phase is denser relative to the refrigerant-rich phase at said second temperature; (e) introducing said refrigerant and lubricant into the vapor-compression refrigeration device at said first temperature; and (f) lubricating said vapor-compression refrigeration device with said lubricant, wherein said lubricating involves increasing the temperature of the vapor-compression refrigeration device to produce an inversion of the refrigerant and lubricant-rich phases.

DETAILED DESCRIPTION OF PREFERRED EMBODIMENTS OF THE INVENTION

Figure 1:
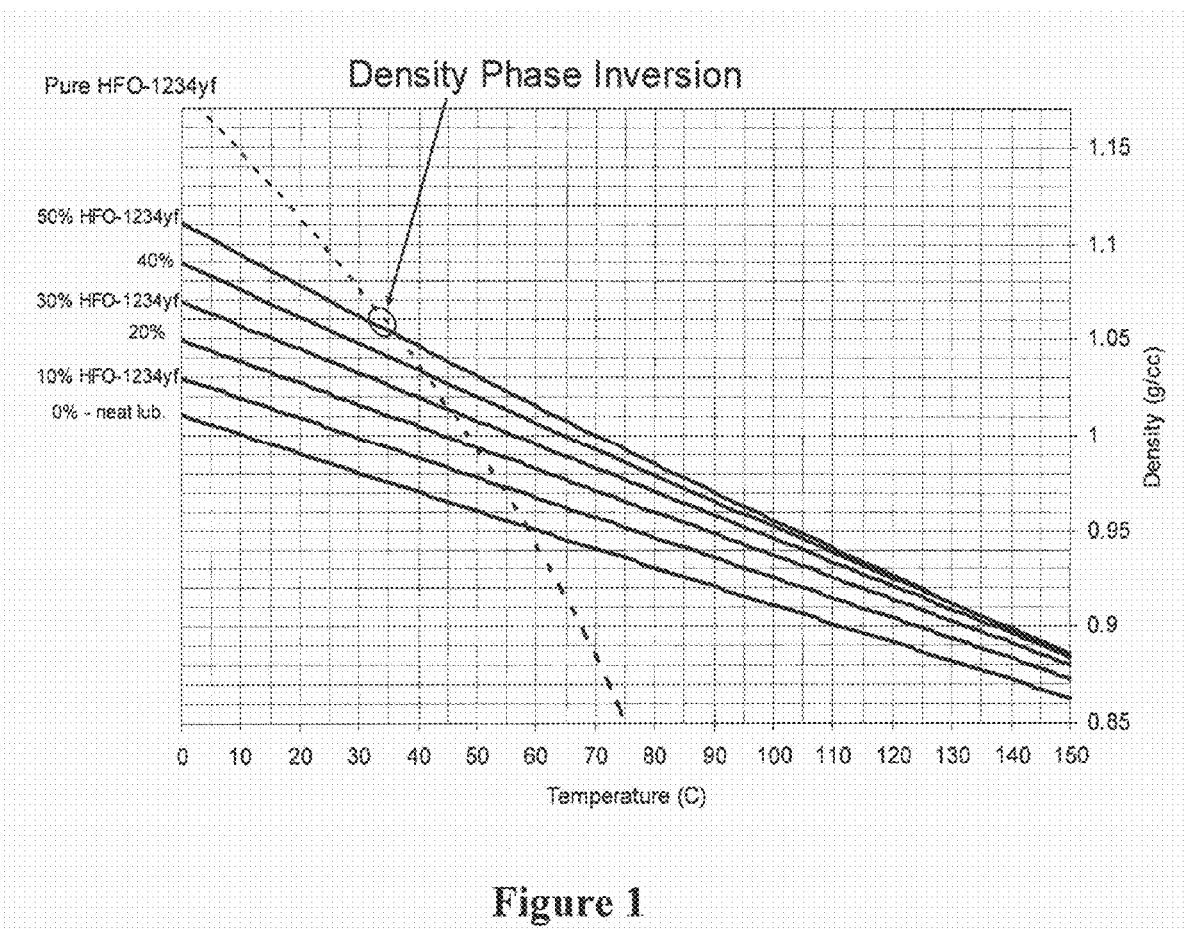
FIG. 1 shows a graph of the density of the polyalkylene glycol lubricant ND 8 oil with HFO-1234yf.

Preferred embodiments of the invention involve the selection of a fluoroalkene refrigerant and a lubricant which, when combined, produce a fluid system having a miscible-type property. Such a fluid system is useful in the operation of vapor-compression refrigeration device.

Useful refrigerants preferably comprises at least one $C_2$ to $C_5$ fluoroalkene, and more preferably a $C_3$ to $C_4$ fluoroalkene. Preferred fluoroalkenes are those having the formula: $XCF_zR_{3-z}$ wherein X is a substituted or unsubstituted vinyl or allyl radical, R is independently Cl, Br, I or H, and z is 1 to 3, preferably 3. Particularly preferred fluoroalkanes include trifluorpropenes, tetrafluoropropenes, and pentafluoropropenes. Examples of preferred isomers of these compounds include cis-1,3,3,3-tetrafluoropropene; trans-1,3,3,3-tetrafluoropropene; 1,1,1,2-tetrafluoropropene; 1,1,1-trifluoro- 3-chloro-2-propene; and 3,3,3-trifluoropropene. The refrigerant can include one of these compounds of some combination thereof.

Useful lubricants include polyol ester and polyalkylene glycols. The polyalkylene glycol lubricants suitable for use with the present invention typically contain from about 5 to 50 oxylakylene repeating units that have from 1 to 5 carbon atoms. The polyalkylene glycol can be straight chain or branched and can be a homopolymer or co-polymer of 2, 3 or more oxyethylene, oxypropylene, oxybutylene or oxypentylene groups or combinations thereof in any proportions. Preferred polyalkylene glycols contain at least 50% oxypropylene groups. Compositions according to the present invention may contain one or more polyalkylene glycols as the lubricant, one or more polyalkylene glycol esters as the lubricant, one or more polyol esters as the lubricant, or a mixture of one of more polyalkylene glycols, one or more polyalkylene glycol esters and one or more polyol esters. Vinyl ethers are also useful in this invention.

Useful polyalkylene glycols are described in U.S. Pat. Nos. 4,971,712; 4,948,525 and 5,254,280, and 4,755,316, the printed specifications of which are incorporated herein by reference. While suitable polyalkylene glycols include glycols terminating at each end with a hydroxyl group, other suitable lubricants include polyalkylene glycols in which either or both terminal hydroxyl group is capped. The hydroxyl group may be capped with alkyl groups containing from 1 to 10 carbon atoms, 1 to 10 carbon atom alkyl groups containing heteroatoms such as nitrogen, the fluoroalkyl groups described by U.S. Pat. No. 4,975,212, the printed specification of which is incorporated herein by reference. When both polyalkylene glycol hydroxyl groups are end capped, the same type or a combination of two different types of terminal capping groups can be used. Either or both hydroxyl groups can also be capped by forming the ester thereof with a carboxylic acid as disclosed by U.S. Pat. No. 5,008,028, the specification of which is also incorporated herein by reference.

The carboxylic acid can also be fluorinated. When both ends of the polyalkylene glycol are capped, either or both ends may be capped with an ester, or one end may be capped with an ester and the other not capped or capped with one of the aforementioned alkyl, heteroalkyl or fluoroalkyl groups.

Commercially available polyalkylene glycol lubricants include Goodwrench Refrigeration Oil for General Motors and MOPAR-56 from Daimler-Chrysler, which is a polyalkylene glycol that is bis-capped by acetyl groups. A wide variety of polyalkylene glycol lubricants are also available from Dow Chemical or Shrieve Chemical Products. Commercially available polyol esters include Mobil EAL Arctic 22CC available from Exxon-Mobil and Solest 120 available from CPI Engineering Services, Inc.

Preferred polyol esters have a structure according to formulae (I) or (II):

  (Formula I)

  (Formula II)

wherein
R is a hydrocarbyl group having at least 2 carbon atoms,
$R^1$ is a hydrocarbylene group,
$R^2$ is H, hydrocarbyl, $-CF_3$, $-R^4CN$, $-R^4NO^2$ or $R^5OCH(R^6)-$,
$R^3$ is a $-R^4CF^3$, $-R^4CN$ or $-R^4NO_2$ group, provided that $R^3$ may be a hydrocarbyl group when $R^2$ is $-R_4CN$,
n is an integer from 1 to about 50,
$R^4$ is a hydrocarbylene group,
$R^5$ is H, a lower hydrocarbyl group or $R^7C(O)-$ where $R^7$ is a hydrocarbyl group, and
$R^6$ is H or a lower hydrocarbyl group.

These are more fully described in U.S. Pat. No. 5,008,028, the printed specification of which is incorporated herein by reference. Preferably the fluoroalkene and the lubricant are substantially immiscible with one another.

The lubricants of this invention typically have a density of when measured at a temperature of from about 25° C. to about 50° C. ranging from about 0.7 g/cm³ to about 1.2 g/cm³; preferably from about 0.9 g/cm³ to about 1 g/cm³; and more preferably from about 0.95 g/cm³ to about 1 g/cm³.

The fluoroalkenes of this invention typically have a density of when measured at a temperature of from about 25° C. to about 50° C. ranging from about from about 0.8 g/cm³ to about 1.4 g/cm³; preferably from about 0.99 g/cm³ to about 1.09 g/cm³; and more preferably from about 1.04 g/cm³ to about 1.19 g/cm³.

In a typical automobile refrigeration system, the fluoroalkene may be present in an amount of from about 60 to about 90 weight percent, preferably from about 65 to about 80 weight percent based on the weight of the total refrigerant and lubricant charge.

In a typical automobile refrigeration system, the lubricant may be present in an amount of from about 10 to about 40 weight percent, preferably from about 20 to about 35 weight percent based on the weight of the total refrigerant and lubricant charge.

In a typical stationary refrigeration system, the fluoroalkene may be present in an amount of from about 70 to about 99 weight percent, preferably from about 80 to about 85 weight percent based on the weight of the total refrigerant and lubricant charge.

In a typical stationary refrigeration system, the lubricant may be present in an amount of from about 1 to about 30 weight percent, preferably from about 15 to about 20 weight percent based on the weight of the overall total refrigerant and lubricant charge.

In preferred embodiments, the refrigerant-lubricant mixture compositions of this invention may have viscosities of from about 1 to 1000 centistokes at about 37° C., more preferably in the range of from about 2 to about 200 centistokes at about 37° C. and even more preferably of from about 4 to about 40 centistokes at about 37° C.

In addition to the HFO refrigerant and lubricant, compositions according to the present invention can include other additives or materials of the type used in refrigeration, air-conditioning and heat pump compositions to enhance their performance. For example, the compositions can also include extreme pressure and anti-wear additives, oxidation and thermal stability improvers, pour and floc point depressants, antifoaming agents, other lubricants soluble and insoluble in HFO's, and the like. Examples of such additives are disclosed in U.S. Pat. No. 5,254,280, the printed specification of which is incorporated herein by reference Compositions of the present invention can thus further include a quantity of mineral oil, alkyl benzene, polyalphaolefin or alkylated naphthalene lubricants or combinations thereof that would not otherwise be miscible or soluble with the HFO but is at least partially miscible or partially soluble when added to the HFO in combination with a polyalkylene glycol, polyalkylene glycol ester or polyol ester. Typically, this is a quantity up to about 5-20 weight %, however in some embodiments may range up to 90 weight %. A surfactant may also be added to compatibilize the mineral oil with the polyalkylene glycol, polyalkylene glycol ester or polyol ester and the HFO, as disclosed in U.S. Pat. No. 6,516,837, the disclosure of which is incorporated herein by reference.

The compositions of the present invention may include other components for the purpose of enhancing or providing certain functionality to the composition, or in some cases to reduce the cost of the composition. For example, the present compositions may also include a compatibilizer, such as propane, for the purpose of aiding compatibility and/or solubility of the lubricant. Such compatibilizers, including propane, butanes and pentanes, are preferably present in amounts of from about 0.5 to about 5 percent by weight of the composition. Combinations of stabilizer, and solubilizing agents may also be added to the present compositions to aid oil solubility, as disclosed by U.S. Pat. No. 6,516,837, the disclosure of which is incorporated by reference.

The composition of this invention may optionally include alkylbenzenes, or hydrocarbon based lubricants in amounts of from 0 to about 30 weight percent.

The fluoroalkene and lubricant forms an immiscible composition having two or more distinct phases, preferably having a distinct interface which can be determined either visually or by refractometry. Provided that the density of each phase is close to that of the other, the fluids can be easily kept in circulation in the compression-type refrigeration device. Preferably, the composition has a refrigerant-rich phase and one or more lubricant-rich phases wherein the difference in density between the refrigerant-rich phase and the lubricant-rich phase is about 20% or less, preferably about 10% or less, and more preferably about 5% or less.

At temperatures below the "phase inversion temperature" the lubricant-rich phase is on top of the refrigerant-rich phase and at temperatures above the "phase inversion temperature" the refrigerant-rich phase is on top of the lubricant-rich phase. The temperature at which a particular composition flips from one phase on top to the other phase on top is the phase inversion temperature. Usually for temperatures less than the phase inversion temperature a majority of lubricant floats on top of the refrigerant-rich phase before the circulation is started. For a temperature near the phase inversion temperature, stable emulsions are produced at all flow rates and once produced, the equilibrium phase separation time is very long, on the order several hours for complete separation. For temperatures greater than the phase inversion temperature, the lubricant-rich phase is present at the bottom of reservoirs, and once flow has begun, a stable emulsion is created. For vessels or components where the withdrawal piping is located at the bottom, at temperatures greater than the phase inversion temperature, circulation rates higher than the charged composition indicate that conglomeration of lubricant-rich phase sinks to the bottom of the reservoir where it is drawn again into circulation. This emulsion and phase inversion temperature behavior allows the reliable operation of the compression-type refrigeration device. That is, the composition is in a form wherein either the refrigerant-rich phase is positioned on the lubricant-rich phase or the lubricant-rich phase is positioned on the refrigerant-rich phase, and a temperature exists at which the positions of the refrigerant-rich phase and the lubricant-rich phase reverse positions relative to one another. Such phase inversion temperatures may range from about −15° C. to about 75° C., preferably from about 10° C. to about 60° C., and more preferably from about 20° C. to about 50° C.

Any of a wide range of methods for introducing the refrigeration compositions of the present invention to a compression refrigeration, air-conditioning or heat pump system can be used from the present invention. For example, one method comprises attaching a refrigerant container to the low-pressure side of a refrigeration system and turning on the refrigeration system compressor to pull the refrigeration composition into the system. In such embodiments, the refrigerant container may be placed on a scale such that the amount of refrigeration composition entering the system can be monitored. When a desired amount of refrigeration composition has been introduced into the system, charging is stopped. Alternatively, a wide range of charging tools, known to those skilled in the art, are commercially available. Accordingly, in light of the above disclosure, those of skill in the art will be readily able to introduce the HFO refrigerant and refrigeration compositions of the present invention into compression refrigeration, air-conditioning and heat pump systems without undue experimentation.

EXAMPLE 1

A calorimetric performance test system using a full automotive air conditioning system utilizing production heat exchangers, lines and compressor was run using PAG RL897 as lubricant and HFO-1234yf as refrigerant. There were no oil return problems. This was because of the surprising emulsion like behavior of the refrigerant/oil mixture. This is due in part to the similarity in density as shown by the inversion in density.

EXAMPLE 2

A circulation loop was constructed to investigate the charge concentration of the loop compared to the circulating composition at various temperatures for an Idemitsu PAG 46PS/HFO-1234yf mixture. The apparatus was constructed such that a large reservoir was drained slowly from the bottom and the liquid was pumped and returned to the top of the reservoir. The pumping rates were regulated to traditional automotive system refrigerant flow rates from 5 to 60 g/sec and the large reservoir was used to simulate an worse case high pressure side liquid receiver. The results are shown in Table 1. For temperatures less than the phase inversion temperature (34° C.) the lubricant-rich phase floats on top of the refrigerant-rich phase before the circulation is started. For flows greater than 15 g/sec, the turbulence in the reservoir is high enough to create a stable emulsion and the circulation concentration is the same as the charged concentration; while even for low flow, the circulating flow still contains a very large percentage of the charged lubricant as the static equilibrium separation concentration is approximately 4%, but a small amount of lubricant rich phase is still present at the surface. For a temperature near the phase inversion temperature, stable emulsions are produced at all flow rates and once produced, the static equilibrium separation time is very long, on the order several hours. For temperatures greater than the phase inversion temperature, the lubricant-rich phase is present at the bottom of the reservoir, and once flow has begun, a stable emulsion is created. The circulation rates higher than the charged composition indicated that conglomeration of lubricant-rich phase sinks to the bottom of the reservoir where it is drawn again into circulation, and is indicative of the experimental setup, whereas in an operating heat pump, AC or refrigeration system the oil that travels into a high pressure liquid receiver will flow through and out of the withdrawal piping and will not be logged vessels or manifolds.

TABLE 1

Circulation Rates for Bottom draw of HFO-1234yf and Idemitsu PAG 46 PS

|  | Temperature 20° C. | Temperature 35° C. | Temperature 45° C. |
| --- | --- | --- | --- |
| Min. Flow Rate 5 g/sec. | Charged: 10.7% Circulating: 8.9% | Charged: 10.8% Circulating: 16.3% | Charged: 10.8% Circulating: 47.4% |
| Avg. Flow Rate 30 g/sec. | Charged: 10.7% Circulating: 10.8% | Charged: 10.7% Circulating: 11.9% | Charged: 10.8% Circulating: 18.8% |
| Max. Flow Rate 50 g/sec. | Charged: 10.6% Circulating: 10.9% | Charged: 10.4% Circulating: 11.0% | Charged: 10.3% Circulating: 19.5% |

Phase inversion and immiscibility has also been measured with polyol ester lubricants at temperatures approximately equivalent to polyalkylene lubricants. Alkylbenzene, mineral oils, polyalpha-olefins and alkylated naphthalenes have phase inversion temperatures greater than 70° C. which limits their application in air conditioning, residential heat pump and refrigeration equipment; however, these mixtures could have application in high temperature heat pump applications. The mixtures of hydrocarbon lubricants such as alkylbenzene, mineral oil, polyalpha-olefin and alkylated naphthalenes with polyol ester have phase inversion temperatures between the POE-HFO mixture and the hydrocarbon lubricant —HFO mixture temperature depending on the POE-hydrocarbon lubricant blending ratio.

EXAMPLE 3

Figure 2:
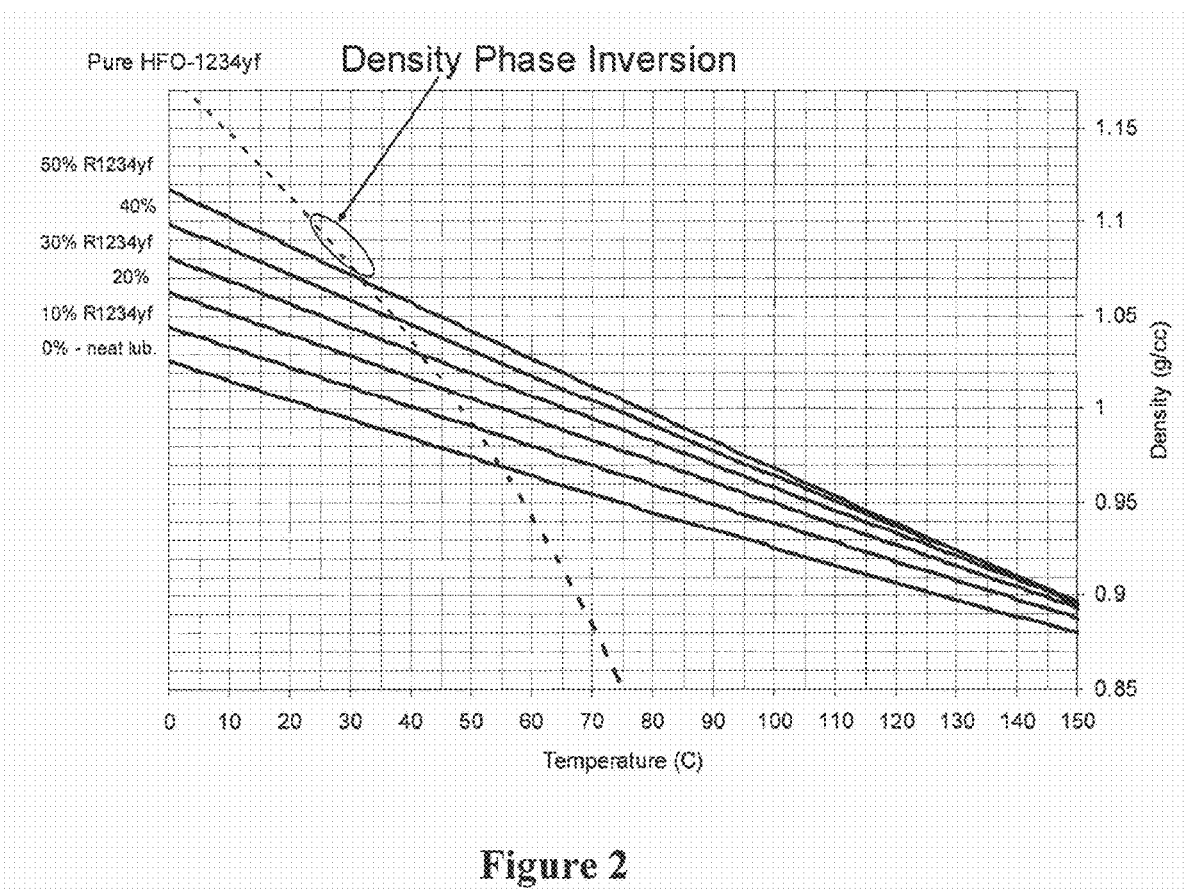
FIG. 2 shows a graph of the density of the polyalkylene glycol lubricant Idemitsu PAG 46 PS with HFO-1234yf.

FIGS. 1 and 2 show the densities of constant concentrations of HFO-1234yf with two different polyalkylene glycol lubricants, Denso ND 8 oil and Idemitsu PAG 46 PS, respectively. While the ND 8 oil and the 46PS lubricants are similar in type classification and viscosity grade, the base molecules for which the final lubricant product is constructed are different. The density curves were experimentally determined by mixing a constant weight percentage of HFO-1234yf with lubricant and measuring the mixture liquid density over the range of temperatures from 0° C. to 150° C. This was repeated for each lubricant—refrigerant ratio progressing from pure lubricant up to 50% HFO-1234yf. For both lubricants at the 50% refrigerant-lubricant blend, the liquid solution becomes immiscible and splits into fluoroalkene rich and fluoroalkene lean phases. This concentration and for concentrations greater than 50% fluoroalkene this mixture exhibits a density phase inversion where the fluoroalkene rich phase becomes lighter than the fluoroalkene lean phase upon heating. This phase inversion occurs at approximately 35° C. for the Denso ND 8 oil, while the Idemitsu PAG 46PS lubricant exhibits a density inversion temperature from approximately 25° C. and 35° C. that varies slightly as the refrigerant lean phase concentration varies.

Prophetic Examples 4-18

The procedure of Example 3 is repeated with the following refrigerant-oil mixtures which produced acceptable results.

EXAMPLE 4 cis-1,3,3,3-tetrafluoropropene/PAG

EXAMPLE 5 trans-1,3,3,3-tetrafluoropropene/PAG

EXAMPLE 6

1,1,1,2-tetrafluoropropene/PAG

EXAMPLE 7

1,1,1-trifluoro-3-chloro-2-propene/PAG

EXAMPLE 8

3,3,3-trifluoropropene/PAG

EXAMPLE 9 cis-1,3,3,3-tetrafluoropropene/PEG

EXAMPLE 10 trans-1,3,3,3-tetrafluoropropene/PEG

EXAMPLE 11

1,1,1,2-tetrafluoropropene/PEG

EXAMPLE 12

1,1,1-trifluoro-3-chloro-2-propene/PEG

EXAMPLE 13

3,3,3-trifluoropropene/PEG

EXAMPLE 14 cis-1,3,3,3-tetrafluoropropene/POE

EXAMPLE 15 trans-1,3,3,3-tetrafluoropropene/POE

EXAMPLE 16

1,1,1,2-tetrafluoropropene/POE

EXAMPLE 17

1,1,1-trifluoro-3-chloro-2-propene/POE

EXAMPLE 18

3,3,3-trifluoropropene/POE

While the present invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. A method for selecting a refrigerant and lubricant for a vapor-compression refrigeration device system comprising:
   a. determining a lower operating temperature range of a vapor-compression refrigeration device;
   b. determining an upper operating temperature range of the vapor-compression refrigeration device; and
   c. selecting a refrigerant comprising at least one $C_2$ to $C_5$ fluoroalkene at a first concentration and selecting a lubricant comprising at least one polyol ester, polyalkylene glycol, or polyalkylene glycol ester at a second concentration to produce a fluid system having a refrigerant-rich phase and a lubricant-rich phase at a first temperature within said lower operating temperature range and at a second temperature within said upper operating temperature range provided that said second temperature is higher than said first temperature, wherein the refrigerant-rich phase is denser relative to the lubricant-rich phase at said first temperature and wherein the lubricant-rich phase is denser relative to the refrigerant-rich phase at said second temperature, provided that the relative difference in densities between the two phases is less than 20% at said first temperature and less than 20% at said second temperature.

2. The method of claim 1 wherein said refrigerant-rich phase and said lubricant-rich phase are liquid and are substantially immiscible with each other at said first and second temperatures.

3. The method of claim 1 wherein said refrigerant has a density within a range of about 0.8 g/cm³ to about 1.2 g/cm³ when measured at a temperature within a range of about 25° C. to about 50° C. and wherein said lubricant has a density within a range of about 0.7 g/cm³ to about 1.0 g/cm³ when measured at a temperature within a range of about 25° C. to about 50° C.

4. The method of claim 1 wherein the fluoroalkene is a $C_3$ or $C_4$ fluoroalkene.

5. The method of claim 1 wherein the fluoroalkene has a formula $XCF_zR_{3-z}$, wherein X is a substituted or unsubstituted vinyl or allyl radical, R is independently Cl, Br, I or H, and z is 1 to 3.

6. The method of claim 5 wherein z is 3.

7. The method of claim 1 wherein the fluoroalkene is selected from the group consisting of trifluorpropene, tetrafluoropropene, and pentafluoropropene.

8. The method of claim 1 wherein the fluoroalkene is selected from the group consisting of cis-1,3,3,3-tetrafluoropropene; trans-1,3,3,3-tetrafluoropropene; 1,1,1,2-tetrafluoropropene; 1,1,1-trifluoro-3-chloro-2-propene; 3,3,3-trifluoropropene; and combinations thereof.

9. The method of claim 1 wherein said polyalkylene glycol is a branched or straight chain polymer having from about 5 to about 50 units of oxyethylene, oxypropylene, oxybutylene, oxypentylene, or combinations thereof.

10. The method of claim 9 wherein said polymer comprises at least 50 weight percent oxypropylene units.

11. The method of claim 1 wherein said polyol ester has a structure according to formulae I or II:

$$RO(R^1O)_nC(O)R^2 \quad \quad (I)$$

$$R^3(O)C(O)R^2 \quad \quad (II)$$

wherein
R is a hydrocarbyl group having at least 2 carbon atoms,
$R^1$ is a hydrocarbylene group,
$R^2$ is H, hydrocarbyl, —$CF_3$, —$R^4CN$, —$R^4NO^2$ or $R^5OCH(R^6)$—,
$R^3$ is a —$R^4CF^3$, —$R^4CN$ or —$R^4NO_2$ group, provided that $R^3$ may be a hydrocarbyl group when $R^2$ is —$R_4CN$,
n is an integer from 1 to about 50,
$R^4$ is a hydrocarbylene group,
$R^5$ is H, a lower hydrocarbyl group or $R^7C(O)$— where $R^7$ is a hydrocarbyl group, and
$R^6$ is H or a lower hydrocarbyl group.

12. The method of claim 1 wherein the relative difference in densities between the two phases is less than 10% at said first temperature and less than 10% at said second temperature.

13. The method of claim 1 wherein the relative difference in densities between the two phases is less than 5% at said first temperature and less than 5% at said second temperature.

14. The method of claim 1 wherein said higher operating temperature range is about +30° C. to about +75° C. and said lower operating temperature range is about −40° C. to about +25° C.

15. The method of claim 1 wherein said higher operating temperature range is about +40° C. to about +50° C. and said lower operating temperature range is selected from the group consisting of: about −40° C. to about −5° C., about −20° C. to about 5° C., and about 0° C. to about 15° C.

16. The method of claim 1 wherein fluid system comprises from about 60 to about 90 weight percent refrigerant and from about 10 to about 40 weight percent lubricant, wherein weight percents are relative to the total weight of said fluid system.

17. The method of claim 1 wherein fluid system comprises from about 70 to about 99 weight percent refrigerant and from about 1 to about 30 weight percent lubricant, wherein weight percents are relative to the total weight of said fluid system.

18. The method of claim 1 wherein said fluid system further comprises one or more of extreme pressure additives, anti-wear additives, oxidation stabilizers, thermal stabilizers, pour and floc point depressants, anti-foaming agents, lubricants soluble in fluoroolefins, mineral oils, alkylbenzenes, polyalpha-olefins, alkylated naphthalenes, polyalkylene glycol esters, surfactants, compatibilizers, and solubilizing agents.

19. A method for introducing a refrigerant and lubricant into a vapor-compression refrigeration device system comprising:
   a. providing a vapor-compression refrigeration device comprising a heat transfer circuit, a compressor having an inlet side and an outlet side, and refrigerant and lubricant reservoir, wherein said reservoir is in fluid communication with the inlet side of the compressor and with said heat transfer circuit, and said heat transfer circuit is in fluid communication with said outlet side of the compressor;
   b. determining the lower operating temperature range of the vapor-compression refrigeration device;
   c. determining the upper operating temperature range of the vapor-compression refrigeration device;

d. selecting a refrigerant comprising at least one $C_2$ to $C_5$ fluoroalkene at a first concentration and selecting a lubricant comprising at least one polyol ester or polyalkylene glycol at a second concentration to produce a fluid system having a refrigerant-rich phase and a lubricant-rich phase at a first temperature within said lower operating temperature range and at a second temperature within said upper operating temperature range provided that said second temperature is higher than said first temperature, wherein the refrigerant-rich phase is denser relative to the lubricant-rich phase at said first temperature and wherein the lubricant-rich phase is denser relative to the refrigerant-rich phase at said second temperature; and e. introducing said refrigerant and lubricant into the vapor-compression refrigeration device.

20. A method for lubricating a vapor-compression refrigeration device system comprising:

a. providing a vapor-compression refrigeration device comprising a heat transfer circuit, a compressor having an inlet side and an outlet side, and refrigerant and lubricant reservoir, wherein said reservoir is in fluid communication with the inlet side of the compressor and with said heat transfer circuit, and said heat transfer circuit is in fluid communication with said outlet side of the compressor;

b. determining the lower operating temperature range of the vapor-compression refrigeration device;

c. determining the upper operating temperature range of the vapor-compression refrigeration device;

d. selecting a refrigerant comprising at least one $C_2$ to $C_5$ fluoroalkene at a first concentration and selecting a lubricant comprising at least one polyol ester or polyalkylene glycol at a second concentration to produce a fluid system having a refrigerant-rich phase and a lubricant-rich phase at a first temperature within said lower operating temperature range and at a second temperature within said upper operating temperature range provided that said second temperature is higher than said first temperature, wherein the refrigerant-rich phase is denser relative to the lubricant-rich phase at said first temperature and wherein the lubricant-rich phase is denser relative to the refrigerant-rich phase at said second temperature;

e. introducing said refrigerant and lubricant into the vapor-compression refrigeration device at said first temperature; and f. lubricating said vapor-compression refrigeration device with said lubricant, wherein said lubricating involves increasing the temperature of the vapor-compression refrigeration device to produce an inversion of the refrigerant and lubricant-rich phases.

21. The method of claim 1 wherein the fluoroalkene comprises 1,1,1,2-tetrafluoropropene.

22. The method of claim 1 wherein the vapor-compression refrigeration device is an air conditioning device.

23. The method of claim 22 wherein the air conditioning device is in an automobile.

24. The method of claim 19 wherein the vapor-compression refrigeration device is an air conditioning device.

25. The method of claim 24 wherein the air conditioning device is in an automobile.

26. The method of claim 20 wherein the vapor-compression refrigeration device is an air conditioning device.

27. The method of claim 26 wherein the air conditioning device is in an automobile.

* * * * *